United States Patent [19]

Lamm

[11] Patent Number: 4,632,983
[45] Date of Patent: Dec. 30, 1986

[54] PYRIDONE DYES CONTAINING A OXYDIAZONE SUBSTITUENT

[75] Inventor: Gunther Lamm, Hassloch, Fed. Rep. of Germany

[73] Assignee: BASF Aktiengesellschaft, Ludwigshafen, Fed. Rep. of Germany

[21] Appl. No.: 558,297

[22] Filed: Dec. 5, 1983

[30] Foreign Application Priority Data

Dec. 4, 1982 [DE] Fed. Rep. of Germany ....... 3244960

[51] Int. Cl.$^4$ ............................................ C07C 107/06
[52] U.S. Cl. ........................................ 534/772; 8/690; 548/131
[58] Field of Search ........................ 260/156; 534/772

[56] References Cited

U.S. PATENT DOCUMENTS 4,201,710  5/1980  Kurtz et al. ........................ 260/156
4,229,343  10/1980  Junge et al. ........................ 260/156

FOREIGN PATENT DOCUMENTS 2804599  8/1979  Fed. Rep. of Germany ...... 260/156

Primary Examiner—Charles F. Warren
Assistant Examiner—Carolyn S. Greason
Attorney, Agent, or Firm—Oblon, Fisher, Spivak, McClelland, & Maier

[57] ABSTRACT

Compounds of the general formula I

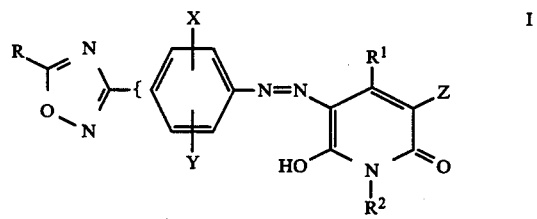

where R is hydrogen or an aliphatic, alkenyl, cycloaliphatic, araliphatic, aromatic or heteroaromatic radical, $R^1$ is hydrogen, amino, hydroxyl or $C_1$–$C_3$-alkyl, $R^2$ is hydrogen, unsubstituted or substituted alkyl, allyl, aralkyl or aryl or alkylamino or arylamino, X is hydrogen, chlorine, bromine, nitro, methyl, phenoxy, tolyloxy, dimethylphenoxy, chlorophenoxy or $C_1$–$C_8$-alkoxy, Y is hydrogen, chlorine or bromine, and Z is hydrogen, acetyl, carbamyl or cyano, are useful for dyeing and/or printing textile material.

2 Claims, No Drawings

PYRIDONE DYES CONTAINING A OXYDIAZONE SUBSTITUENT

BACKGROUND OF THE INVENTION

1. Field of the Invention

The present invention relates to compounds of the general formula I

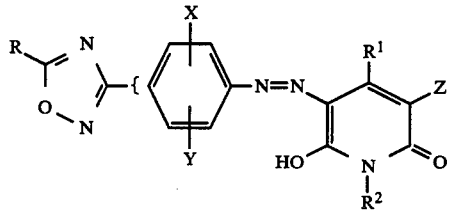

where R is hydrogen or an aliphatic, alkenyl, cycloaliphatic, araliphatic, aromatic or heteroaromatic radical, $R^1$ is hydrogen, amino, hydroxyl or $C_1$–$C_3$-alkyl, $R^2$ is hydrogen, unsubstituted or substituted alkyl, allyl, aralkyl or aryl or alkylamino or arylamino, X is hydrogen, chlorine, bromine, nitro, methyl, phenoxy, tolyloxy, dimethylphenoxy, chlorophenoxy or $C_1$–$C_8$-alkoxy, Y is hydrogen, chlorine or bromine, and Z is hydrogen, acetyl, carbamyl or cyano.

2. Description of the Prior Art:

R is, for example, $C_1$–$C_{17}$-alkyl which can furthermore be interrupted by oxygen and substituted by, for example, phenyl, methylphenyl, carboxyl, a carboxylic ester group or unsubstituted or substituted phenoxy, or R is hydroxycarbonylvinyl, alkoxycarbonylvinyl, cycloalkyl of 5 to 7 carbon atoms, phenyl which is unsubstituted or substituted by chlorine, bromine, $C_1$–$C_4$-alkyl or $C_1$–$C_4$-alkoxy, or pyridyl or thienyl.

Specific examples of radicals R are methyl, ethyl, n- and i-propyl, n- and i-butyl, n- and i-pentyl, n-hexyl, n-heptyl, 1-ethylpentyl, decyl, undecyl, dodecyl, $C_{15}H_{31}$, $C_{17}H_{35}$, $H_5C_2O_2CC_2H_4$—, $H_9C_4O_2CC_2H_4$—,

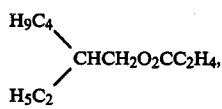

$H_3COC_2H_4O_2CC_2H_4$, $H_5C_2OC_2H_4O_2CC_2H_4$, $H_9C_2H_4O_2CC_2H_4$, 2-ethylhexyloxymethyl and -ethyl, hexyloxyethyl, isopropoxyethyl, phenyl, chlorophenyl, cyclohexyl and in particular phenoxymethyl and -ethyl and benzyloxymethyl.

Alkyl radicals $R^2$ are in particular, of not more than 18 carbon atoms, and can be straight-chain or branched. Phenyl-$C_1$–$C_4$-alkyl and unsubstituted or substituted phenyl or phenylamino are also suitable.

Specific examples of radicals $R^2$ are methyl, ethyl, n- and i-propyl, n- and i-butyl, n-pentyl, n-hexyl, n- and i-heptyl, n- and i-octyl, n-nonyl, n-decyl, n-undecyl, phenyl, m-tolyl, p-tolyl, phenylamino, 2-ethylhexyloxypropyl, hexyloxypropyl, hydroxyethoxyethyl and hydroxybutoxypropyl.

Examples of alkoxy radicals X are octyloxy, β-ethylhexyloxy, hexyloxy, phenoxy, amyloxy, butoxy, i-butoxy, propoxy, i-propoxy, ethoxy and, preferably, methoxy.

To prepare the compounds of the formula I, a diazonium compound of an amine of the formula

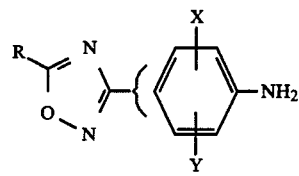

can be reacted with a coupling component of the formula

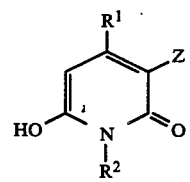

In the Examples which follow, and illustrate the preparation, parts and percentages are by weight, unless stated otherwise.

Of particular importance are compounds of the formula Ia

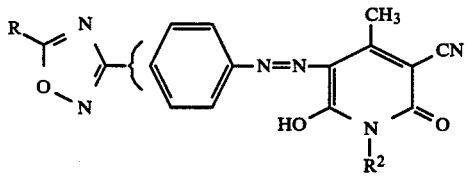

where R is $C_3$–$C_{17}$-alkyl, or is $C_1$- or $C_2$-alkyl which is substituted by $C_4$–$C_8$-alkoxy, phenoxy or benzyloxy, or is $C_1$–$C_4$ alkyl which is substituted by $C_1$–$C_8$-alkoxycarbonyl which may or may not be interrupted by oxygen, and $R^2$ is hydrogen, $C_1$–$C_6$-alkyl or allyl, and $R^2$ is not hydrogen when R contains a phenyl ring. Preferably the sum of the carbon atoms of R and $R^2$ together is from 4 to 13, in particular from 5 to 11.

If $R^2$ is hydrogen, R should preferably not contain a phenyl ring.

The compounds of the formula I are yellow disperse dyes which have very good fastness properties and excellent color strength. Moreover, the tinctorial properties are generally satisfactory.

Dyes which contain hydroxyl groups in R or $R^2$ are, as a rule, suitable for leather and nylon.

Some of the dyes are also useful for printing on cotton and cotton/polyester blends, for example by the method described in German Patent No. 1,811,796.

The stated $\lambda_{max}$ values for the dyes were determined in a solution comprising 9 parts of dimethylformamide and 1 part of glacial acetic acid.

EXAMPLES 1

98 parts of the compound of the formula

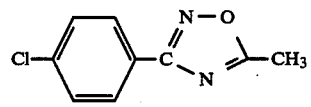

are dissolved in 250 parts by volume of 96–98% strength sulfuric acid at from 0° to 20° C., 25 parts by volume of a 98% strength nitric acid are added at from 10° to 40° C., while cooling, the mixture is stirred overnight at room temperature and then poured onto about 900 parts of ice and 300 parts of water at 0° C., and stirring is then continued to complete the reaction. The resulting precipitate of the product of the formula

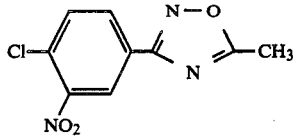

is filtered off under suction, washed neutral with water, and dried to give 116 parts of a colorless powder having a melting point of 110° C.

210 parts of this product in 500 parts by volume of alcohol and 900 parts by volume of 25% strength ammonia water are stirred in an autoclave for 10 hours at 150° C.

Thereafter, the solvent is distilled off as far as possible, and water is added to the residue to precipitate the product. The latter is filtered off under suction and dried, and 193 parts of the diazo component of the formula

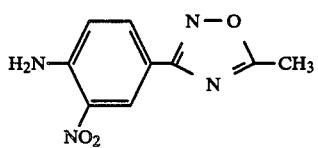

are obtained. 44 parts of this diazo component are stirred with 210 parts by volume of glacial acetic acid, about 60 parts of bromine are then added dropwise at from 25° to 55° C., and at the same time about 80 parts of sodium acetate are added.

After the bromination, the mixture is poured into water, and the pH is brought to 4–6 with sodium hydroxide solution. The product is filtered off under suction, washed with water and dried to give 56 parts of a yellow powder of the formula

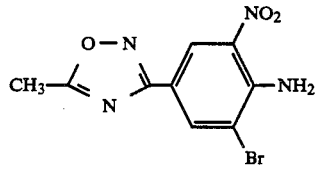

which has a melting point of 152° C.

13.5 parts of the bromine-free product are suspended in 80 parts by volume of glacial acetic acid, 20 parts by volume of propionic acid and 3 parts of sulfuric acid, 22 parts of a 44% strength solution of nitrosylsulfuric acid are added dropwise in the course of 20 minutes at from 0° to 7° C., and the mixture is then stirred for a further 2–3 hours at from 0° to 5° C. The clear solution is then poured onto about 180 parts of ice and 150 parts of water at 0° C., and excess nitrous acid is destroyed in a conventional manner. The pH of the solution is then increased to 1.0–1.5 by adding a little sodium acetate, the temperature being kept at 0° C. by adding ice.

A solution of 14.5 parts of 1-n-hexyl-2-hydroxy-3-cyano-4-methylpyrid-6-one in 200 parts of water and 10 parts of 50% strength sodium hydroxide solution are run into the resulting diazonium salt solution, while stirring thoroughly, the temperature being kept at 0°–10° C. by adding ice water. A yellow precipitate of the dye of the formula

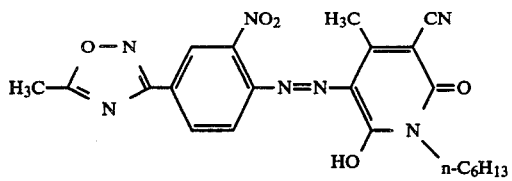

is obtained.

Filtration under suction, washing with water and drying in a conventional manner give 24.4 parts of a yellow powder which dissolves in dimethylformamide to give a yellow solution. The dye dyes polyester fabric in very lightfast intense hues, and has very good tinctorial properties. A solution of the dye in a 9:1 mixture of acetonitrile with glacial acetic acid has an absorption maximum at 442 nm (concentration about 0.01 part/1,000 parts by volume).

For example, the intermediates of the general formula II which are listed in Table A can be prepared by a procedure similar to that described in Example 1.

TABLE A

| No. | R | X | Y | Z | $\lambda_{max}$ (mm, in $CH_3OH$) | Melting point °C. |
|---|---|---|---|---|---|---|
| 1 | $CH_3$ | H | Cl | Cl | | 108 |
| 2 | $CH_3$ | $NO_2$ | Cl | Cl | | 93 |
| 3 | $CH_3$ | $NO_2$ | Br | $NH_2$ | | 150–153 |
| 4 | $CH_3$ | $NO_2$ | Cl | $NH_2$ | | 95–97 |
| 5 | $C_2H_5$ | $NO_2$ | H | $NH_2$ | | 123–125 |
| 6 | $C_2H_5$ | $NO_2$ | Cl | $NH_2$ | 402 | |
| 7 | $C_2H_5$ | $NO_2$ | Br | $NH_2$ | | 127–129 |
| 8 | $C_2H_5$ | H | H | Cl | | 16–20 |
| 9 | $C_2H_5$ | $NO_2$ | H | Cl | | 45–49 |
| 10 | $C_3H_7$ | H | H | Cl | | 57–58 |
| 11 | $C_3H_7$ | $NO_2$ | H | Cl | | 36–40 |
| 12 | $C_3H_7$ | $NO_2$ | H | $NH_2$ | | 128–131 |
| 13 | $C_3H_7$ | $NO_2$ | Cl | $NH_2$ | 403 | |
| 14 | $C_3H_7$ | $NO_2$ | Br | $NH_2$ | | 85–87 |
| 15 | $(CH_3)_2CH-$ | H | H | Cl | | <25 |
| 16 | $(CH_3)_2CH-$ | $NO_2$ | H | Cl | | 30–33 |
| 17 | $(CH_3)_2CH-$ | $NO_2$ | Cl | $NH_2$ | 403 | |
| 18 | $(CH_3)_2CH-$ | $NO_2$ | Br | $NH_2$ | 403 | |
| 19 | $CH_3CH_2CH-$<br>$\|$<br>$CH_3$ | H | H | Cl | | 10–20 |
| 20 | $CH_3CH_2CH-$<br>$\|$<br>$CH_3$ | $NO_2$ | H | Cl | 304 | 20–26 |
| 21 | $CH_3CH_2CH-$<br>$\|$<br>$CH_3$ | $NO_2$ | H | $NH_2$ | | 60–66 |

TABLE A-continued

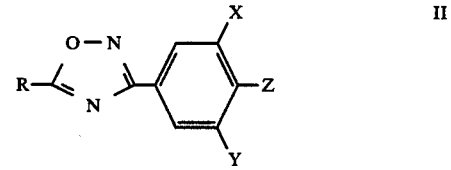

| No. | R | X | Y | Z | $\lambda_{max}$ (mm, in $CH_3OH$) | Melting point °C. |
|---|---|---|---|---|---|---|
| 22 | $CH_3CH_2CH(CH_3)-$ | $NO_2$ | Cl | $NH_2$ | 403.5 | |
| 23 | $CH_3CH_2CH(CH_3)-$ | $NO_2$ | Br | $NH_2$ | 403.5 | |
| 24 | $n-C_5H_{11}$ | H | H | Cl | 246 | |
| 25 | $n-C_5H_{11}$ | $NO_2$ | H | Cl | 306 | |
| 26 | $n-C_5H_{11}$ | $NO_2$ | H | $NH_2$ | 405 | |
| 27 | $n-C_5H_{11}$ | $NO_2$ | Cl | $NH_2$ | 403 | |
| 28 | $n-C_5H_{11}$ | $NO_2$ | Br | $NH_2$ | 403 | |
| 29 | $(CH_3)_3C-$ | H | H | Cl | 246.5 | 0–5 |
| 30 | $(CH_3)_3C-$ | $NO_2$ | H | Cl | 303 | 103 |
| 31 | $(CH_3)_3C-$ | $NO_2$ | H | $NH_2$ | 406.5 | 133–135 |
| 32 | $(CH_3)_3C-$ | $NO_2$ | Cl | $NH_2$ | | 134–136 |
| 33 | $(CH_3)_3C-$ | $NO_2$ | Br | $NH_2$ | 402.5 | 135–137 |
| 34 | $n-C_6H_{13}$ | H | H | Cl | 246 | |
| 35 | $n-C_6H_{13}$ | $NO_2$ | H | Cl | 307 | |
| 36 | $n-C_6H_{13}$ | $NO_2$ | H | $NH_2$ | 407 | |
| 37 | $n-C_6H_{13}$ | $NO_2$ | Cl | $NH_2$ | 404.5 | |
| 38 | $n-C_6H_{13}$ | $NO_2$ | Br | $NH_2$ | 404.5 | |
| 39 | $CH_3OCH_2CH_2$ | $NO_2$ | H | $NH_2$ | | 137–141 |
| 40 | $CH_3OCH_2CH_2$ | $NO_2$ | Br | $NH_2$ | 401.5 | |
| 41 | $n-C_7H_{15}$ | H | H | Cl | 247 | |
| 42 | $n-C_7H_{15}$ | $NO_2$ | H | Cl | 305 | |
| 43 | $n-C_7H_{15}$ | $NO_2$ | H | $NH_2$ | 407 | |
| 44 | $n-C_7H_{15}$ | $NO_2$ | Cl | $NH_2$ | 406 | |
| 45 | $n-C_7H_{15}$ | $NO_2$ | Br | $NH_2$ | 406 | |
| 46 | $n-C_4H_9-CH(C_2H_5)-$ | H | H | Cl | | <10 |
| 47 | $n-C_4H_9-CH(C_2H_5)-$ | $NO_2$ | H | Cl | 304 | ≦16 |
| 48 | $n-C_4H_9-CH(C_2H_5)-$ | $NO_2$ | H | $NH_2$ | 405.5 | |
| 49 | $n-C_4H_9-CH(C_2H_5)-$ | $NO_2$ | Cl | $NH_2$ | 404 | |
| 50 | $n-C_4H_9-CH(C_2H_5)-$ | $NO_2$ | Br | $NH_2$ | 405 | |
| 51 | $(CH_3)_3C(CH_2)_5-$ | H | H | Cl | 245 | |
| 52 | $(CH_3)_3C(CH_2)_5-$ | $NO_2$ | H | Cl | 307 | |
| 53 | $(CH_3)_3C(CH_2)_5-$ | $NO_2$ | H | $NH_2$ | 405 | |
| 54 | $(CH_3)_3C(CH_2)_5-$ | $NO_2$ | Cl | $NH_2$ | 406 | |
| 55 | $(CH_3)_3C(CH_2)_5-$ | $NO_2$ | Br | $NH_2$ | 406 | |
| 56 | $CH_3(CH_2)_{10}-$ | H | H | Cl | 246 | |
| 57 | $CH_3(CH_2)_{10}-$ | $NO_2$ | H | Cl | 306 | |
| 58 | $CH_3(CH_2)_{10}-$ | $NO_2$ | H | $NH_2$ | 407 | |
| 59 | $CH_3(CH_2)_{10}-$ | $NO_2$ | Cl | $NH_2$ | 406 | |
| 60 | $CH_3(CH_2)_{10}-$ | $NO_2$ | Br | $NH_2$ | 406 | |
| 61 | $CH_3(CH_2)_{14}-$ | H | H | Cl | 247 | |
| 62 | $CH_3(CH_2)_{14}-$ | $NO_2$ | H | Cl | 306 | |
| 63 | $CH_3(CH_2)_{14}-$ | $NO_2$ | H | $NH_2$ | 407 | |
| 64 | $CH_3(CH_2)_{14}-$ | $NO_2$ | Cl | $NH_2$ | 406 | |
| 65 | $CH_3(CH_2)_{14}-$ | $NO_2$ | Br | $NH_2$ | 406 | |
| 66 | $CH_3(CH_2)_{16}-$ | H | H | Cl | 247 | |
| 67 | $CH_3(CH_2)_{16}-$ | $NO_2$ | H | Cl | 307 | |
| 68 | $CH_3(CH_2)_{16}-$ | $NO_2$ | H | $NH_2$ | 407 | |
| 69 | $CH_3(CH_2)_{16}-$ | $NO_2$ | Cl | $NH_2$ | 406 | |
| 70 | $CH_3(CH_2)_{16}-$ | $NO_2$ | Br | $NH_2$ | 406 | |
| 71 | $CH_3OCH_2-$ | H | H | Cl | | 66–70 |
| 72 | $CH_3OCH_2-$ | $NO_2$ | H | Cl | 303 | |
| 73 | $CH_3OCH_2-$ | $NO_2$ | H | $NH_2$ | 405 | |
| 74 | $CH_3OCH_2-$ | $NO_2$ | Cl | $NH_2$ | 401 | |
| 75 | $CH_3OCH_2-$ | $NO_2$ | Br | $NH_2$ | 401 | |
| 76 | $C_2H_5OCH_2-$ | H | H | Cl | | 64–67 |
| 77 | $C_2H_5OCH_2-$ | $NO_2$ | H | Cl | 303 | |
| 78 | $C_2H_5OCH_2-$ | $NO_2$ | H | $NH_2$ | 406 | |
| 79 | $C_2H_5OCH_2-$ | $NO_2$ | Cl | $NH_2$ | 401 | |
| 80 | $C_2H_5OCH_2-$ | $NO_2$ | Br | $NH_2$ | 401 | |
| 81 | $C_3H_7-OCH_2-$ | H | H | Cl | | 33–38 |
| 82 | $C_6H_5-$ | H | H | Cl | | 115 |
| 83 | $C_6H_5-$ | $NO_2$ | H | Cl | 245.5 | |

EXAMPLE 2

240 parts of 3-acetylaminobenzonitrile in a mixture of 450 parts by volume of water, 87 parts of sodium carbonate, 129 parts of hydroxylamine sulfate and 450 parts by volume of isobutanol, and 2 parts of a compound which forms a complex with heavy metals (eg. ethylenediaminetetraacetic acid), are stirred for 6 hours, with vapor cooling, after which the lower, aqueous phase is cooled and then separated off, and 450 parts by volume of distilled water are added. 270 parts of 2-ethylhexanoyl chloride and sodium carbonate are then added, while stirring very thoroughly, so that the mixture is kept at pH 4–7, and stirring is then continued for a further 30 minutes. The mixture is then diluted with water, and the resulting precipitate is filtered off under suction, washed with water and dried to give 420 parts of the compound of the formula

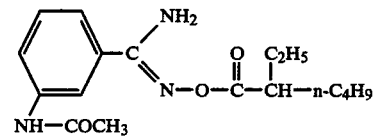

of melting point 148° C.

If the product obtained is heated at 150°–160° C., and the melt is stirred for 1 hour at this temperature, water is eliminated to give the compound of the formula in the form of a viscous oil which, after standing for a relatively long time, crystallizes to give a product of melting point 88°–90° C. Yield: 380 parts.

75 parts of this oil in 250 parts by volume of methanol are stirred with 50 parts of concentrated sulfuric acid for from 2 to 2½ hours, with vapor cooling. Thereafter, some of the methanol is distilled off, precipitation is effected by pouring the mixture onto ice water, and the pH is increased to 5–7. The oily phase is extracted with cyclohexane, ethyl acetate, etc., and the product of the formula

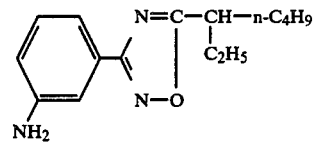

is isolated in a conventional manner.

64 parts of a very slightly yellowish oil, whose UV spectrum in methanol has a maximum at 318 nm, are obtained.

For example, the intermediates of the formula III which are shown in Table B can be obtained by a procedure similar to that described in Examples 1 and 2.

TABLE B

III

| No. | R | X | Z | $\lambda_{max}$ (nm) or melting point (°C.) |
|---|---|---|---|---|
| 1 | $CH_3$ | H | $NHCOCH_3$ | 170–173 |
| 2 | $CH_3$ | $NHCOCH_3$ | H | 90–92 |
| 3 | $CH_3$ | Cl | Cl | 108–111 |
| 4 | $C_2H_5$ | H | $NH—COC_2H_5$ | 148–150 |
| 5 | $C_2H_5$ | $NH—COCH_3$ | H | 131 |
| 6 | $C_3H_7$ | $NH—COCH_3$ | H | 295.5 nm |
| 7 | $C_3H_7$ | H | $NHCOCH_3$ | 136 |
| 8 | $HO_2CC_2H_4$— | $NH—COCH_3$ | | 154 |
| 9 | $n-C_4H_9$ | $NH—COCH_3$ | H | 276.5 nm |
| 10 | $t-C_4H_9$ | $NH—COCH_3$ | $NH—COCH_3$ | 170–172 |
| 11 | $CH_2OC_6H_5$ | $NH—COCH_3$ | H | 108–110 |
| 12 | $n-C_4H_9$ | $NH—COCH_3$ | H | 156–160 |
| 13 | $n-C_6H_{13}$ | H | NHCHO | 153–157 |
| 14 | $n-C_6H_{13}$ | H | $NH—COCH_3$ | 272 nm |
| 15 | $n-C_4H_9—CH—$ $\phantom{n-C_4H_9—}C_2H_5$ | H | $NH—COCH_3$ | 158–163 |
| 16 | $n-C_7H_{15}$ | $NH—COCH_3$ | H | 144–145 |
| 17 | $n-C_8H_{17}$ | $NH—COCH_3$ | H | 141–144 |
| 18 | $n-C_8H_{17}$ | H | $NH—COCH_3$ | 274 nm |
| 19 | $(CH_3)_3C(CH_2)_5$— | $NH—COCH_3$ | H | 135–140 |
| 20 | $n-C_{11}H_{23}$ | $NH—COCH_3$ | H | 237–241 |
| 21 | $n-C_{11}H_{23}$ | H | $NH—COCH_3$ | 273 nm |
| 22 | $CH_3(CH_2)_{12}$— | H | $NHCOCH_3$ | 272.5 nm |
| 23 | $CH_3(CH_2)_{12}$— | $NHCOCH_3$ | H | 295.5 nm |
| 24 | $CH_3(CH_2)_{14}$— | $NHCOCH_3$ | H | 296 nm |
| 25 | $CH_3(CH_2)_{14}$— | H | $NHCOCH_3$ | 136–139 |
| 26 | $CH_3(CH_2)_{16}$— | H | $NHCOCH_3$ | 127 |
| 27 | $CH_3OCH_2$— | H | $NHCOCH_3$ | 129–130 |
| 28 | $CH_3OCH_2$— | $NH—COCH_3$ | H | 294 nm |
| 29 | $C_2H_5OCH_2$— | $NH—COCH_3$ | H | 156–160 |
| 30 | $C_2H_5OCH_2$— | H | $NH—COCH_3$ | 276 nm |
| 31 | $(CH_3)_2CH$— | H | $NH—COCH_3$ | 271 nm |
| 32 | $(CH_3)_2CH$— | $NHCOCH_3$ | H | 295 nm |
| 33 | $C_6H_5OCH_2CH_2$— | H | $NH—COCH_3$ | 150 |
| 34 | $C_6H_5$— | H | $NH—COCH_3$ | 183–185 |
| 35 | $ClCH_2CH_2$— | H | $NH—COCH_3$ | 163 (decomposition) |
| 36 | $CH_3$— | Cl | Cl | 111 |
| 37 | [pyridyl] | H | $NH—COCH_3$ | 120 |
| 38 | $CH_2=CH$— | H | $NH—COCH_3$ | 160–162 (decomposition) |
| 39 | $ClCH_2$— | H | $NH—COCH_3$ | 185–188 (decomposition) |

TABLE B-continued

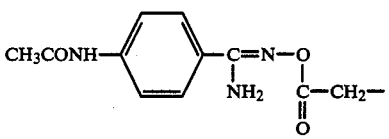

| No. | R | X | Z | $\lambda_{max}$ (nm) or melting point (°C.) |
|---|---|---|---|---|
| 40 | (see structure below) | H | NH—COCH$_3$ | 220–230 |
| 41 | HO$_2$CCH$_2$CH$_2$— | H | NH—COCH$_3$ | 270 nm (154) |
| 42 | HO$_2$CCH=CH— | H | NH—COCH$_3$ | 278 nm |
| 43 | ClCH$_2$CH$_2$CH$_2$— | H | NH—COCH$_3$ | 273 nm |
| 44 | C$_6$H$_5$OCH$_2$— | H | NH—COCH$_3$ | 155 |

Structure for No. 40:

CH$_3$CONH—C$_6$H$_4$—C(NH$_2$)=N—O—C(=O)—CH$_2$—

EXAMPLE 3

144 parts of 4-acetylaminobenzamidoxime are dissolved in 200 parts by volume of N-methylpyrrolidone and 200 parts by volume of acetone, and 90 parts of volume of butyryl chloride are added, 10% strength sodium hydroxide solution being added at the same time so that the pH of the reaction mixture is kept at 4.5–7.0. Stirring is continued for 1 hour at from 25° to 45° C., after which precipitation is effected by dilution with water, and the precipitate is filtered off under suction, washed salt-free with water and dried to give 180 parts of the product of the formula

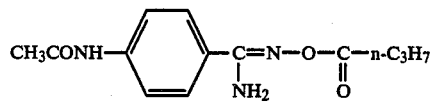

When the colorless powder is heated at 170° C., water is eliminated to give the product of the formula

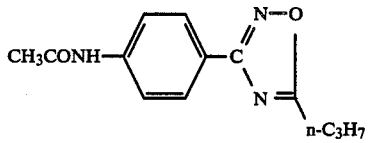

in the form of a melt which, when it is cooled, solidifies to give a product of melting point 171° C.

This compound is brominated by a conventional method (for example in glacial acetic acid or sulfuric acid at ≦40° C.) to give 1-acetylamino-2-bromo-4-(5-n-propyl-1,2,4-oxadiazol-3-yl)-benzene of the formula

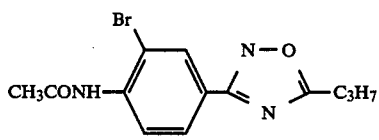

(UV spectrum: $\lambda_{max}$=268.5 nm in methanol).

41 parts of this product in 200 parts by volume of methanol are stirred with 30 parts of concentrated sulfuric acid, with vapor cooling. After 1 hour, the mixture is neutralized and some of the methanol is then distilled off. The reaction mixture is diluted with water, and the resulting precipitate is filtered off under suction, washed with water and dried to give 33 parts of the diazo component of the formula

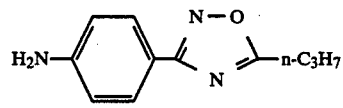

in the form of a colorless powder of melting point 88°–90° C.

41 parts of 4-(5-n-propyl-1,2,4-oxadiazol-3-yl)aniline in 200 parts by volume of glacial acetic acid and 45 parts of anhydrous sodium acetate are stirred, 80 parts of bromine are added at from 20° to 50° C., stirring is continued for a further 2 hours and the resulting, colorless product of the formula

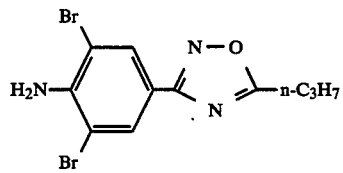

is precipitated with water ($\lambda_{max}$=284.5 nm).

The product is filtered off under suction, washed with water and dried to give 69 parts of a colorless powder. If the bromination is carried out in 85–98% sulfuric acid, a smaller amount of bromine is required.

The compounds of the general formula IV which are stated in Table C can be prepared by a procedure similar to that described in the Examples.

TABLE C $$\text{IV}$$

Structure: benzene ring with substituents X, X¹, Y, Z, connected to 1,2,4-oxadiazole ring bearing R (N—O, N positions as shown).

| No. | R | X¹ | X | Y | Z | λ_max. (nm) or melting point (°C.) |
|---|---|---|---|---|---|---|
| 1 | CH₃ | H | Cl | H | NH—COCH₃ | 134–136 (269.0 nm) |
| 2 | CH₃ | H | Cl | H | NH₂ | 283 nm |
| 3 | CH₃ | H | H | NH₂ | H | 97–98 |
| 4 | CH₃ | H | Cl | Cl | NH₂ | 110 (282.5 nm) |
| 5 | CH₃ | H | Br | H | NH—COCH₃ | 152–155 |
| 6 | CH₃ | H | Br | H | NH₂ | 148–150 (284.0 nm) |
| 7 | CH₃ | H | Br | Br | NH₂ | 160–161 (283 nm) |
| 8 | CH₃ | Br | H | NH₂ | Br | 289 nm |
| 9 | CH₃ | NO₂ | H | NH₂ | H | 130–135 |
| 10 | CH₃ | H | H | NH₂ | NO₂ | 98–103 |
| 11 | CH₃ | H | CH₃ | H | NO₂ | 143–145 |
| 12 | CH₃ | H | CH₃ | H | NH₂ | 136–138 |
| 13 | CH₃ | CH₃ | H | NH₂ | H | 322 nm |
| 14 | C₂H₅ | H | H | H | NH—COCH₃ | 149–150 |
| 15 | C₂H₅ | H | H | Br | NH—COCH₃ | 113–114 (268.5 nm) |
| 16 | C₂H₅ | H | H | Br | NH₂ | 65–67 (248.5 nm) |
| 17 | C₂H₅ | H | H | Cl | NH₂ | 283 nm |
| 18 | C₂H₅ | H | Cl | Cl | NH₂ | 290 nm |
| 19 | C₂H₅ | H | H | Cl | NH—COCH₃ | 267 nm |
| 20 | C₂H₅ | H | Br | Br | NH₂ | 284.5 nm |
| 21 | C₂H₅ | Br | H | NH—COCH₃ | Br | 160–165 (290.5 nm) |
| 22 | C₂H₅ | H | H | NH₂ | H | 318 230 nm |
| 23 | C₂H₅ | H | H | NH—COCH₃ | H | 302 nm |
| 24 | C₂H₅ | Br | H | NH₂ | Br | 306 nm |
| 25 | C₂H₅ | H | H | NH₂ | NO₂ | 95–99 |
| 26 | C₂H₅ | NO₂ | H | NH₂ | H | 76–81 |
| 27 | n-C₃H₇ | H | H | H | NH—COCH₃ | 168–171 |
| 28 | n-C₃H₇ | H | Cl | H | NH—COCH₃ | 267 nm |
| 29 | n-C₃H₇ | H | Cl | H | NH₂ | 218 and 283 nm |
| 30 | n-C₃H₇ | H | Cl | Cl | NH₂ | 283 nm |
| 31 | n-C₃H₇ | H | H | NH—COCH₃ | H | 299 nm |
| 32 | n-C₃H₇ | H | H | NH₂ | H | 317 and 229 nm |
| 33 | n-C₃H₇ | H | H | H | NH₂ | 88–90 |
| 34 | CH₃OCH₂ | H | H | NHCOCH₃ | H | 302 nm |
| 35 | CH₃OCH₂ | H | Br | H | NHCOCH₃ | 79–83 |
| 36 | CH₃OCH₂ | H | Br | H | H | 269 nm |
| 37 | CH₃OCH₂ | H | H | NH₂ | H | 316 nm |
| 38 | CH₃OCH₂ | H | Br | Br | NH₂ | 283 nm |
| 39 | CH₃OCH₂ | H | Cl | Cl | NH₂ | 282 nm |
| 40 | CH₃OCH₂ | H | H | Cl | NH₂ | 218 and 282 nm |
| 41 | CH₃OCH₂ | H | H | Br | NH₂ | 46–49 286.5 nm |
| 42 | CH₃OCH₂ | H | H | H | NHCHO | 276 nm |
| 43 | CH₃OCH₂ | H | H | NHCHO | H | 308 nm |
| 44 | (CH₃)₃C | H | Br | H | NH₂ | 56–58 284.5 nm |
| 45 | (CH₃)₃C | H | Br | Br | NH₂ | 87–89 284.5 nm |
| 46 | CH₃OCH₂CH₂ | H | H | NHCOCH₃ | H | 294 nm |
| 47 | CH₃OCH₂CH₂ | H | H | H | NHCOCH₃ | 273 nm |
| 48 | CH₃OCH₂CH₂ | H | Br | H | NHCOCH₃ | 268 nm |
| 49 | CH₃OCH₂CH₂ | H | Br | Br | NHCOCH₃ | 275 nm |
| 50 | (CH₃)₂CH— | H | H | NHCOCH₃ | H | 296 nm |
| 51 | (CH₃)₂CH— | H | H | H | NHCOCH₃ | 275 nm |
| 52 | (CH₃)₂CH— | H | H | Br | NHCOCH₃ | 267.5 nm |
| 53 | (CH₃)₂CH— | H | H | Br | NH₂ | 220 and 285 nm |
| 54 | (CH₃)₂CH— | H | H | NH₂ | H | 228 and 318 nm |

TABLE C-continued

Structure IV: benzene ring with substituents X, X¹, Y, Z connected to 1,2,4-oxadiazole ring with substituent R (N—O, N positions shown)

| No. | R | X¹ | X | Y | Z | λ$_{max.}$ (nm) or melting point (°C.) |
|---|---|---|---|---|---|---|
| 55 | (CH₃)₂CH— | H | Br | Br | NH₂ | 222 and 285 nm |
| 56 | (CH₃)₂CH— | H | Cl | Cl | NH₂ | 221 and 283 nm |
| 57 | (CH₃)₂CH— | H | Cl | H | NH₂ | 286 nm |
| 58 | n-C₄H₉ | H | H | NH—COCH₃ | H | 296 nm |
| 59 | n-C₄H₉ | H | H | H | NH—COCH₃ | 274 nm |
| 60 | n-C₄H₉ | H | H | H | NH₂ | 286 nm |
| 61 | n-C₄H₉ | H | H | Br | NH₂ | 288 nm |
| 62 | n-C₄H₉ | H | Br | Br | NH₂ | 222 and 284.5 nm |
| 63 | n-C₄H₉ | H | Cl | Cl | NH₂ | 221 and 284 nm |
| 64 | (CH₃)₃C— | H | H | NHCOCH₃ | H | 295 nm |
| 65 | (CH₃)₃C— | H | H | H | NHCOCH₃ | 173–175 |
| 66 | (CH₃)₃C— | H | H | Br | NHCOCH₃ | 85–87 |
| 67 | (CH₃)₃C— | H | H | Cl | NHCOCH₃ | 220 and 268 nm |
| 68 | n-C₆H₁₃ | H | H | NHCOCH₃ | H | 231.5 and 296 nm |
| 69 | n-C₆H₁₃ | H | H | NH₂ | H | 228.5 and 316 nm |
| 70 | n-C₆H₁₃ | H | H | H | NHCOCH₃ | 273 nm |
| 71 | n-C₆H₁₃ | H | H | H | NH₂ | 284 nm |
| 72 | n-C₆H₁₃ | H | H | Br | NH₂ | 286 nm |
| 73 | n-C₆H₁₃ | H | H | Br | NHCOCH₃ | 287 nm |
| 74 | n-C₆H₁₃ | H | H | Cl | NHCOCH₃ | 268 nm |
| 75 | n-C₆H₁₃ | H | Br | Br | NH₂ | 285 nm |
| 76 | n-C₆H₁₃ | H | Cl | Cl | NH₂ | 284 nm |
| 77 | n-C₇H₁₅ | H | Cl | Cl | NH₂ | 285 nm |
| 78 | n-C₇H₁₅ | H | H | Cl | NHCOCH₃ | 268.5 nm |
| 79 | n-C₇H₁₅ | H | H | H | NHCOCH₃ | 274 nm |
| 80 | n-C₇H₁₅ | H | H | Br | NHCOCH₃ | 276 nm |
| 81 | n-C₇H₁₅ | H | H | Br | NH₂ | 284.5 and 220 nm |
| 82 | n-C₇H₁₅ | H | Br | Br | NH₂ | 285 nm |
| 83 | n-C₇H₁₅ | H | H | NH₂ | H | 316.5 and 228 nm |
| 84 | n-C₇H₁₅ | H | H | NHCOCH₃ | H | 295 and 231 nm |
| 85 | n-C₇H₁₅ | H | H | Cl | NH₂ | 285 nm |
| 86 | n-C₇H₁₅ | H | H | NH₂ | Cl | 320 nm |
| 87 | n-C₄H₉—CH(C₂H₅)— | H | Br | Br | NH₂ | 285 nm |
| 88 | n-C₄H₉—CH(C₂H₅)— | H | H | Br | NH₂ | 284 nm |
| 89 | n-C₄H₉—CH(C₂H₅)— | H | H | Cl | NHCOCH₃ | 25 |
| 90 | n-C₄H₉—CH(C₂H₅)— | H | H | Br | NHCOCH₃ | 25 |
| 91 | n-C₄H₉—CH(C₂H₅)— | H | H | Br | NH₂ | 20 |
| 92 | n-C₄H₉—CH(C₂H₅)— | H | H | H | NH—COC₂H₅ | 48–53 |

TABLE C-continued

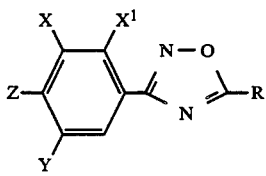

| No. | R | X¹ | X | Y | Z | $\lambda_{max.}$ (nm) or melting point (°C.) |
|---|---|---|---|---|---|---|
| 93 | n-C$_4$H$_9$—CH(C$_2$H$_5$)— | H | H | NH$_2$ | Cl | 10–16 |
| 94 | n-C$_4$H$_9$—CH(C$_2$H$_5$)— | H | H | H | NH$_2$ | 38–40 |
| 95 | (CH$_3$)$_3$C(CH$_2$)$_5$— | H | H | H | H | 317 and 228 nm |
| 96 | (CH$_3$)$_3$C(CH$_2$)$_5$— | H | H | NHCOCH$_3$ | H | 296 nm |
| 97 | (CH$_3$)$_3$C(CH$_2$)$_5$— | H | H | H | NHCOCH$_3$ | 269 nm |
| 98 | (CH$_3$)$_3$C(CH$_2$)$_5$— | H | H | Br | NHCOCH$_3$ | 268.5 nm |
| 99 | (CH$_3$)$_3$C(CH$_2$)$_5$— | H | H | Br | NH$_2$ | 287 nm |
| 100 | (CH$_3$)$_3$C(CH$_2$)$_5$— | H | Br | Br | NH$_2$ | 285 nm |
| 101 | CH$_3$(CH$_2$)$_{10}$— | H | Br | Br | NH$_2$ | 286 nm |
| 102 | CH$_3$(CH$_2$)$_{10}$— | H | H | Br | NH$_2$ | 287 nm |
| 103 | CH$_3$(CH$_2$)$_{10}$— | H | H | H | NH$_2$ | 285 nm |
| 104 | CH$_3$(CH$_2$)$_{10}$— | H | H | H | NHCOCH$_3$ | 296 nm |
| 105 | CH$_3$(CH$_2$)$_{10}$— | H | H | Br | NHCOCH$_3$ | 269 nm |
| 106 | CH$_3$(CH$_2$)$_{10}$— | H | Br | Br | NH$_2$ | 286 nm |
| 107 | CH$_3$(CH$_2$)$_{10}$— | H | H | NHCOCH$_3$ | H | 296.5 nm |
| 108 | CH$_3$(CH$_2$)$_{10}$— | H | H | NH$_2$ | H | 319 nm |
| 109 | CH$_3$(CH$_2$)$_{14}$— | H | H | NH$_2$ | H | |
| 110 | CH$_3$(CH$_2$)$_{14}$— | H | H | H | NHCOCH$_3$ | 78–85 |
| 111 | CH$_3$(CH$_2$)$_{14}$— | H | H | H | NH$_2$ | 285.5 nm 50–60 |
| 112 | CH$_3$(CH$_2$)$_{14}$— | H | H | Br | NH$_2$ | 286 nm |
| 113 | CH$_3$(CH$_2$)$_{14}$— | H | Br | Br | NH$_2$ | 287 nm |
| 114 | CH$_3$(CH$_2$)$_{14}$— | H | H | Br | NHCOCH$_3$ | 270 nm |
| 115 | CH$_3$(CH$_2$)$_{14}$— | H | H | NH$_2$ | H | 320 nm |
| 116 | C$_{17}$H$_{35}$ | H | H | H | NHCOCH$_3$ | 80–85 |
| 117 | CH$_3$(CH$_2$)$_{16}$— | H | H | NH$_2$ | H | 319 nm |
| 118 | CH$_3$(CH$_2$)$_{16}$— | H | H | H | NH$_2$ | 286 nm |
| 119 | CH$_3$(CH$_2$)$_{16}$— | H | H | Br | NH$_2$ | 287 nm |
| 120 | CH$_3$(CH$_2$)$_{16}$— | H | Br | Br | NH$_2$ | 288 nm |
| 121 | CH$_3$(CH$_2$)$_{16}$— | H | H | Br | NHCOCH$_3$ | 274 nm |
| 122 | 3-pyridyl | H | H | H | NHCOCH$_3$ | 250–253 |
| 123 | C$_6$H$_5$ | H | H | H | NHCOCH$_3$ | 180–183 |
| 123a | C$_6$H$_5$ | H | H | NHCOCH$_3$ | H | 190–193 |
| 124 | C$_6$H$_5$ | H | H | Br | NHCOCH$_3$ | 268.5 nm |
| 125 | C$_6$H$_5$ | H | Br | Br | NHCOCH$_3$ | 269 nm |
| 126 | C$_6$H$_5$ | H | Cl | Cl | NHCOCH$_3$ | 266 nm |
| 127 | C$_6$H$_5$ | H | Cl | Cl | NH$_2$ | 142–145 |
| 128 | C$_6$H$_5$ | H | H | Br | NH$_2$ | 289 nm |
| 129 | C$_6$H$_5$ | H | H | Cl | NH$_2$ | 289 nm |
| 130 | C$_6$H$_5$ | H | H | NH$_2$ | H | 320 nm 143–145 |
| 131 | cyclohexyl | H | H | NH$_2$ | H | 317 nm |
| 132 | cyclohexyl | H | H | H | NH$_2$ | 287 nm |

TABLE C-continued

Structure IV:
Benzene ring with substituents X¹, X, Z, Y connected to a 1,2,4-oxadiazole ring via C=N, with R on the oxadiazole.

| No. | R | X¹ | X | Y | Z | λ_max. (nm) or melting point (°C.) |
|---|---|---|---|---|---|---|
| 133 | cyclohexyl (H) | H | H | H | NHCOCH₃ | 275 nm |
| 134 | cyclohexyl (H) | H | H | Br | NHCOCH₃ | 268 nm |
| 135 | C₆H₅OCH₂— | H | H | H | NHCOCH₃ | 165 275.0 nm |
| 135a | C₆H₅OCH₂— | H | NH₂ | H | H | 115 |
| 136 | C₆H₅OCH₂— | H | H | H | NH₂ | 110–112 |
| 137 | C₆H₅CH₂OCH₂— | H | H | H | NH₂ | 90–94 |
| 138 | C₆H₅CH₂OCH₂— | H | H | NH₂ | H | 318 nm |
| 139 | 4-Cl-C₆H₄-OCH₂— | H | H | NH₂ | H | 319 nm |
| 140 | 4-Cl-C₆H₄-OCH₂— | H | H | H | NH₂ | 286 nm |
| 141 | —(CH₂)₂— (bis-oxadiazolyl-aryl) | H | H | NHCOCH₃ | H | 295 nm |
| 142 | —(CH₂)₂— (bis-oxadiazolyl-aryl) | H | H | NH₂ | H | 317 nm |
| 143 | —(CH₂)₂— (bis-oxadiazolyl-aryl) | H | H | H | NH₂ | 283 nm |
| 144 | —(CH₂)₂— (bis-oxadiazolyl-aryl) | H | H | H | NHCOCH₃ | 274 nm |

TABLE C-continued

Structure IV:

Ar(X, X¹, Y, Z)-CH=N-O-C(R)=N (1,2,4-oxadiazole with aryl group)

| No. | R | X¹ | X | Y | Z | λ_max. (nm) or melting point (°C.) |
|---|---|---|---|---|---|---|
| 145 | —(CH₂)₂— [oxadiazole-aryl(Y,Z,X,¹X)] | H | H | Br | NHCOCH₃ | 267 nm |
| 146 | —(CH₂)₂— [oxadiazole-aryl(Y,Z,X,¹X)] | H | H | Br | NH₂ | 284 nm |
| 147 | —C(CH₃)₂— [oxadiazole-aryl(Y,Z,X,¹X)] | H | H | Br | NH₂ | 269 nm |
| 148 | —C(CH₃)₂— [oxadiazole-aryl(Y,Z,X,¹X)] | H | H | NH₂ | H | 316 nm |
| 149 | —(CH₂)₄— [oxadiazole-aryl(Y,Z,X,¹X)] | H | H | NH₂ | H | 318 nm |
| 150 | —(CH₂)₄— [oxadiazole-aryl(Y,Z,X,¹X)] | H | H | H | NH₂ | 284.5 nm |
| 151 | —(CH₂)₄— [oxadiazole-aryl(Y,Z,X,¹X)] | H | H | Br | NH₂ | 289 nm |
| 152 | C₆H₅CH₂— | H | H | H | NH₂ | 285 nm |
| 153 | C₆H₅CH₂— | H | H | NH₂ | H | 319 nm |

TABLE C-continued

Structure IV:

![Structure IV: benzene ring with X, X¹, Y, Z substituents and N—O / N=C—R heterocycle]

| No. | R | X¹ | X | Y | Z | λ_max (nm) or melting point (°C.) |
|---|---|---|---|---|---|---|
| 154 | CH₃O—C₆H₄—CH₂— | H | H | NH₂ | H | 319 and 228 nm |
| 155 | CH₃O—C₆H₄—CH₂— | H | H | H | NH₂ | 281 nm |
| 156 | (CH₃)₃C—C₆H₄— | H | H | H | NH₂ | 103–105 279.5 nm |
| 157 | (CH₃)₃C—C₆H₄— | H | H | H | NHCOCH₃ | 183–185 273.5 nm |
| 158 | (CH₃)₃C—C₆H₄— | H | H | NH₂ | H | 319 and 228 nm |
| 159 | —CH₃ | H | H | NH₂ | OCH₃ | 325 nm |
| 160 | CH—\|C₂H₅ | H | H | NH₂ | OCH₃ | 325 nm |
| 161 | CH₃O₂CC₂H₄ | H | H | H | NH₂ | 105–107 |
| 162 | HO₂CC₂H₄ | H | H | NH₂ | H | 318 nm |
| 163 | HO₂CC₂H₄ | H | H | H | NH₂ | 284 nm |
| 164 | HO₂CC₂H₄ | H | H | NH₂ | Br | 321 nm |
| 165 | HO₂CC₂H₄ | H | H | NHCOCH₃ | H | 295.5 nm |

EXAMPLE 4

370 parts of the compound of the formula

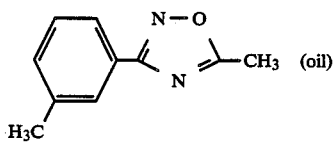

are introduced into 800 g of 96% strength sulfuric acid at from 15° to 20° C., 150 parts by volume of concentrated nitric acid are then added dropwise at from 0° to 10° C., and the mixture is stirred for a further hour at room temperature. When nitration is complete, the mixture is poured onto ice water and stirred until the reaction is complete, and the precipitate is buffered at pH 4.5–7.

The oily phase is separated off, and stirred with about 1,000 parts by volume of methanol. The resulting yellow precipitate is filtered off under suction, washed with methanol and dried to give 100 parts of a product of melting point 143°–146° C., the formula of which is probably

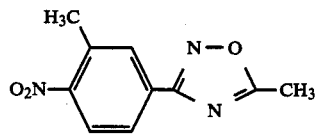

The filtrate contains, in addition to a small amount of this product, an isomer which presumably has the following formula

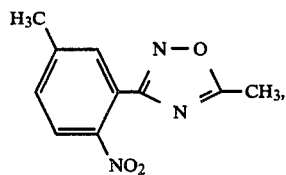

This compound is isolated by evaporating the methanol.

By means of catalytic (or Béchamp) reduction, the nitro compounds are converted to the amines of the formula

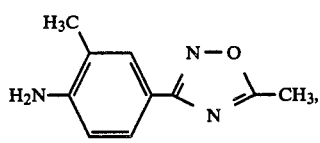

of melting point 136°–138° C. (or

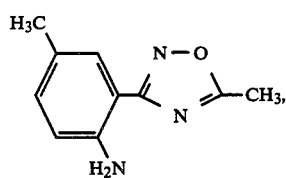

having a melting range from 100° to 135° C., since this product contains a small amount of impurities).

If nitration is carried out using the oxadiazole derivatives of the formulae

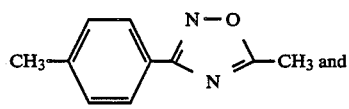

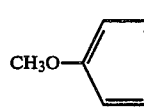

pure nitro derivatives of the formulae

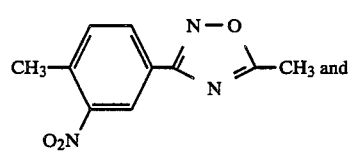

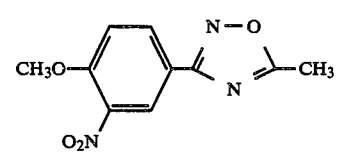

respectively, are obtained, which can be reduced to the corresponding amines in a conventional manner.

The yellow dyes of the general formulae V and VI shown in Tables D and E can be prepared by methods similar to those described.

TABLE D

| No. | R | $R^1$ | X | $X^1$ | Y | $\lambda_{max.}$ (nm) |
|---|---|---|---|---|---|---|
| 1 | n-C$_4$H$_9$—CH(C$_2$H$_5$)— | CH$_3$ | H | H | H | 438 |
| 2 | n-C$_4$H$_9$—CH(C$_2$H$_5$)— | C$_2$H$_5$ | H | H | H | 439.5 |
| 3 | n-C$_4$H$_9$—CH(C$_2$H$_5$)— | n-C$_3$H$_7$ | H | H | H | 439.5 |
| 4 | n-C$_4$H$_9$—CH(C$_2$H$_5$)— | i-C$_3$H$_7$ | H | H | H | 439.5 |
| 5 | n-C$_4$H$_9$—CH(C$_2$H$_5$)— | n-C$_4$H$_9$ | H | H | H | 439.5 |
| 6 | n-C$_4$H$_9$—CH(C$_2$H$_5$)— | i-C$_4$H$_9$ | H | H | H | 439.5 |
| 7 | n-C$_4$H$_9$—CH(C$_2$H$_5$)— | n-C$_6$H$_{13}$ | H | H | H | 439.5 |
| 8 | CH$_3$(CH$_2$)$_6$— | CH$_3$ | H | H | H | 439.5 |
| 9 | CH$_3$(CH$_2$)$_6$— | H | H | H | H | 438 |
| 10 | CH$_3$(CH$_2$)$_6$— | C$_2$H$_5$ | H | H | H | 439 |
| 11 | CH$_3$(CH$_2$)$_6$— | n-C$_3$H$_7$ | H | H | H | 439 |
| 12 | CH$_3$(CH$_2$)$_6$— | i-C$_3$H$_7$ | H | H | H | 439 |
| 13 | cyclohexyl | CH$_3$ | H | H | H | 439 |
| 14 | cyclohexyl | C$_2$H$_5$ | H | H | H | 439 |
| 15 | cyclohexyl | n-C$_3$H$_7$ | H | H | H | 439 |
| 16 | cyclohexyl | i-C$_3$H$_7$ | H | H | H | 439 |
| 17 | n-C$_4$H$_9$—CH(C$_2$H$_5$)— | C$_2$H$_4$OCH$_3$ | H | H | H | 439 |
| 18 | n-C$_4$H$_9$—CH(C$_2$H$_5$)— | C$_3$H$_6$OCH$_3$ | H | H | H | 439 |
| 19 | C$_6$H$_5$CH$_2$OC$_2$H$_4$ | CH$_3$ | H | H | H | 439.5 |
| 20 | HO$_2$CC$_2$H$_4$ | H | H | H | H | 438 |
| 21 | HO$_2$CC$_2$H$_4$ | C$_3$H$_6$OCH$_3$ | H | H | H | 438.5 |

TABLE D-continued

Structure V:
R—(1,2,4-oxadiazole)—C6H2(X)(X¹)(Y)—N=N—pyridone(CH3, CN, =O, OH, N-R¹)

| No. | R | R¹ | X | X¹ | Y | λmax. (nm) |
|---|---|---|---|---|---|---|
| 22 | HO2CC2H4 | C2H4OC2H4OH | H | H | H | 438.5 |
| 23 | HO2CC2H4 | C3H6OC4H8OH | H | H | H | 438.5 |
| 24 | HO2CC2H4 | C3H6OC2H4OCH3 | H | H | H | 438.5 |
| 25 | HO2CCH2— | C3H6OC2H4OCH3 | H | H | H | 439 |
| 26 | HO2CCH2— | C3H6OC4H8OH | H | H | H | 439 |
| 27 | n-C4H9—CH(C2H5)— | CH2CH=CH2 | H | H | H | 439.5 |
| 28 | C6H5OCH2— | CH3 | H | H | H | 439 |
| 29 | C6H5OCH2— | C2H5 | H | H | H | 439 |
| 30 | CH3 | C2H5 | H | H | H | 437.5 |
| 31 | CH3 | CH3 | H | H | H | 438 |
| 32 | CH3 | H | H | H | H | 438 |
| 33 | C2H5 | H | H | H | H | 438 |
| 34 | C2H5 | CH3 | H | H | H | 438 |
| 35 | C2H5 | C2H5 | H | H | H | 439 |
| 36 | C2H5 | n-C3H7 | H | H | H | 439 |
| 37 | C2H5 | CHCH2=CH2 | H | H | H | 440 |
| 38 | n-C3H7 | CH3 | H | H | H | 439 |
| 39 | n-C3H7 | C2H5 | H | H | H | 439.5 |
| 40 | n-C3H7 | n-C4H9 | H | H | H | 439.5 |
| 41 | n-C4H9—CH(C2H5)— | H | Br | H | H | 438 |
| 42 | n-C4H9—CH(C2H5)— | CH3 | Br | H | H | 438 |
| 43 | n-C4H9—CH(C2H5)— | CH3 | Cl | H | H | 438 |
| 44 | n-C4H9—CH(C2H5)— | CH3 | NO2 | H | H | 447 |
| 45 | n-C4H9—CH(C2H5)— | H | NO2 | H | H | 446 |
| 46 | n-C4H9—CH(C2H5)— | C2H5 | NO2 | H | H | 448 |

TABLE E

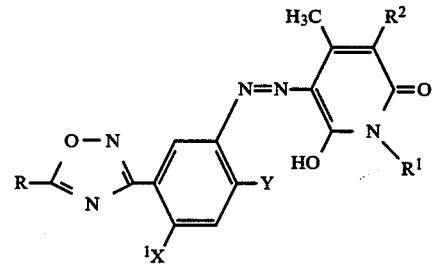

Structure VI

| No. | R | R¹ | R² | Y | X¹ | λmax.(nm) or melting point (°C.) |
|---|---|---|---|---|---|---|
| 1 | n-C3H7 | CH3 | H | NO2 | H | 436 nm |
| 2 | n-C3H7 | C2H5 | H | NO2 | H | 437 nm |
| 3 | n-C3H7 | n-C3H7 | H | NO2 | H | 437 nm |
| 4 | n-C3H7 | n-C4H9 | H | NO2 | H | 437 nm |
| 5 | n-C3H7 | n-C6H13 | H | NO2 | H | 437 nm |
| 6 | n-C7H15 | H | H | NO2 | H | 110–116 |
| 7 | n-C7H15 | CH3 | H | NO2 | H | 103–108 |
| 8 | n-C7H15 | C2H5 | H | NO2 | H | 105–109 |
| 9 | n-C7H15 | n-C3H7 | H | NO2 | H | 100–103 |
| 10 | n-C4H9—CH(C2H5)— | H | H | NO2 | H | 436 nm |
| 11 | n-C4H9—CH(C2H5)— | H | COCH3 | NO2 | H | 439 nm |
| 12 | n-C4H9—CH(C2H5)— | CH3 | H | NO2 | H | 438 nm |
| 13 | n-C4H9—CH(C2H5)— | C2H5 | H | NO2 | H | 438 nm |

TABLE E-continued

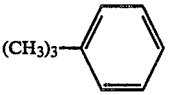

| No. | R | R¹ | R² | Y | X¹ | $\lambda_{max}$(nm) or melting point (°C.) |
|---|---|---|---|---|---|---|
| 14 | n-C₄H₉—CH(C₂H₅)— | n-C₃H₇ | H | NO₂ | H | 438 nm |
| 15 | n-C₈H₁₇ | H | H | NO₂ | H | 437 nm |
| 16 | n-C₈H₁₇ | CH₃ | H | NO₂ | H | 438 nm |
| 17 | n-C₈H₁₇ | C₂H₅ | H | NO₂ | H | 438 nm |
| 18 | n-C₄H₉—CH(C₂H₅)— | H | CN | Br | H | 429 nm |
| 19 | n-C₄H₉—CH(C₂H₅)— | H | CN | Cl | Cl | 425 nm |
| 20 | n-C₄H₉—CH(C₂H₅)— | CH₃ | CN | Cl | Cl | 426 nm |
| 21 | n-C₄H₉—CH(C₂H₅)— | CH₃ | CN | Br | H | 429 nm |
| 22 | (CH₃)₃-C₆H₄- 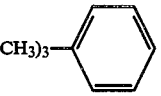 | n-C₄H₉ | CN | Cl | Cl | 425 nm |
| 23 | (CH₃)₃-C₆H₄- | n-C₄H₉ | CN | Br | Br | 425 nm |
| 24 | n-C₈H₁₇ | CH₂CH₂OCH₃ | CN | H | H | 428 nm |
| 25 | n-C₈H₁₇ | (CH₂)₃OCH₃ | CN | H | H | 428 nm |
| 26 | n-C₄H₉—OC₂H₄ | H | CN | H | H | 427.5 nm |
| 27 | n-C₄H₉—OC₂H₄ | CH₃ | CN | Cl | H | 428 nm |
| 28 | n-C₄H₉—OC₂H₄ | CH₃ | H | NO₂ | H | 436 nm |
| 29 | n-C₄H₉—OC₂H₄ | C₂H₅ | H | NO₂ | H | 436 nm |
| 30 | n-C₄H₉—CH(C₂H₅)—OC₂H₄ | H | H | NO₂ | H | 436 nm |
| 31 | n-C₄H₉—CH(C₂H₅)—OC₂H₄ | CH₃ | H | NO₂ | H | 437 nm |
| 32 | n-C₄H₉—CH(C₂H₅)—OC₂H₄ | H | CN | H | H | 427.5 nm |
| 33 | C₆H₅—OCH₂— 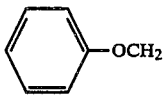 | n-C₃H₇ | CN | H | H | 428.5 nm |

TABLE E-continued

VI structure: pyridone azo dye with oxadiazole, substituents R, R¹, R², Y, X¹

| No. | R | R¹ | R² | Y | X¹ | λ_max.(nm) or melting point (°C.) |
|---|---|---|---|---|---|---|
| 34 | phenyl-OCH₂ | C₂H₅ | CN | H | H | 428.5 nm |
| 35 | 4-Cl-phenyl-OCH₂ | C₂H₅ | CN | H | H | 428.5 nm |
| 36 | 4-Cl-phenyl-OCH₂ | CH₃ | CN | H | H | 428.5 nm |
| 37 | 4-CH₃-phenyl-OCH₂ | CH₃ | CN | H | H | 428.5 nm |
| 38 | phenyl-CH₂OC₂H₄ | CH₃ | CN | H | H | 428.5 nm |
| 39 | HO₂CC₂H₄ | H | CN | H | H | 428.5 nm |
| 40 | HO₂CC₂H₄ | H | CONH₂ | H | H | 412 nm |
| 41 | HO₂CC₂H₄ | H | H | H | H | 410 nm |
| 42 | HO₂CC₂H₄ | CH₃ | H | H | H | 410 nm |
| 43 | HO₂CC₂H₄ | CH₃ | CONH₂ | H | H | 413 nm |
| 44 | HO₂CC₂H₄ | C₃H₆OCH₃ | CONH₂ | H | H | 413 nm |
| 45 | HO₂CC₂H₄ | C₃H₆OCH₃ | H | H | H | 412 nm |
| 46 | HO₂CC₂H₄ | C₃H₆OCH₃ | CN | H | H | 412 nm |
| 47 | HO₂CC₂H₄ | C₃H₆OC₂H₄OH | CN | H | H | 429 nm |
| 48 | HO₂CC₂H₄ | C₃H₆OC₄H₈OH | CN | H | H | 429 nm |
| 49 | n-C₄H₉—CH(C₂H₅)— | H | COCH₃ | H | H | 410 nm |

The greenish yellow dyes of the general formula VII which are stated in the Table can be prepared by a procedure similar to that described in the examples.

TABLE F

VII

[Structure diagram showing a compound with R-oxadiazole group connected to a benzene ring with X¹ and X substituents, linked via N=N azo group to a pyridone ring with CH₃, CN, =O, HO, and N-R¹ groups]

| No. | R | R¹ | X | X¹ | λ$_{max.}$ (nm) or melting point (°C.) |
|---|---|---|---|---|---|
| 1 | n-C₄H₉—CH(C₂H₅)— | CH₃ | H | H | 428 nm |
| 2 | n-C₄H₉—CH(C₂H₅)— | C₂H₅ | H | H | 428.5 nm |
| 3 | n-C₄H₉—CH(C₂H₅)— | n-C₃H₇ | H | H | 428.5 nm |
| 4 | n-C₄H₉—CH(C₂H₅)— | i-C₃H₇ | H | H | 428.5 nm |
| 5 | n-C₄H₉—CH(C₂H₅)— | n-C₄H₉ | H | H | 429 nm |
| 6 | n-C₄H₉—CH(C₂H₅)— | i-C₄H₉ | H | H | 429 nm |
| 7 | n-C₄H₉—CH(C₂H₅)— | n-C₆H₁₃ | H | H | 429 nm |
| 8 | n-C₄H₉—CH(C₂H₅)— | cyclohexyl | H | H | 428 nm |
| 9 | n-C₄H₉—CH(C₂H₅)— | C₂H₄OH | H | H | 428 nm |
| 10 | n-C₄H₉—CH(C₂H₅)— | C₃H₆OH | H | H | 428 nm |
| 11 | n-C₄H₉—CH(C₂H₅)— | C₆H₁₃OH | H | H | 428 nm |
| 12 | n-C₄H₉—CH(C₂H₅)— | C₂H₄OCH₃ | H | H | 428 nm |
| 13 | n-C₄H₉—CH(C₂H₅)— | C₃H₆OCH₃ | H | H | 428 nm |
| 14 | n-C₄H₉—CH(C₂H₅)— | C₃H₆OC₂H₅ | H | H | 428 nm |
| 15 | n-C₄H₉—CH(C₂H₅)— | C₂H₄OC₄H₉ | H | H | 428 nm |

TABLE F-continued

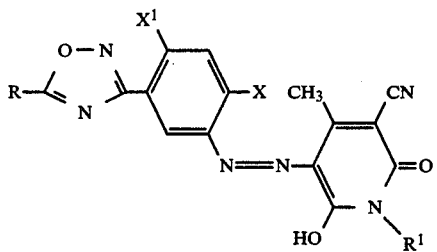

| No. | R | R¹ | X | X¹ | $\lambda_{max.}$ (nm) or melting point (°C.) |
|---|---|---|---|---|---|
| 16 | n-C$_4$H$_9$—CH(C$_2$H$_5$)— | CH$_3$ | Br | H | 429 nm |
| 17 | n-C$_4$H$_9$—CH(C$_2$H$_5$)— | n-C$_4$H$_9$ | Br | Br | 416 nm |
| 18 | n-C$_4$H$_9$—CH(C$_2$H$_5$)— | CH$_2$CH=CH$_2$ | H | H | 429 nm |
| 19 | n-C$_7$H$_{15}$ | H | H | H | 427 nm |
| 20 | n-C$_7$H$_{15}$ | CH$_3$ | H | H | 427,5 nm 131–133 |
| 21 | n-C$_7$H$_{15}$ | C$_2$H$_5$ | H | H | 427.5 nm 142–145 |
| 22 | n-C$_7$H$_{15}$ | C$_3$H$_7$ | H | H | 427.5 nm |
| 23 | n-C$_6$H$_{13}$ | H | H | H | 427.5 nm |
| 24 | n-C$_6$H$_{13}$ | CH$_3$ | H | H | 427.5 nm |
| 25 | n-C$_6$H$_{13}$ | C$_2$H$_5$ | H | H | 427.5 nm |
| 26 | n-C$_6$H$_{13}$ | CH$_2$CH=CH$_2$ | H | H | 427.5 nm |
| 27 | n-C$_3$H$_7$ | H | H | H | 427 nm |
| 28 | n-C$_3$H$_7$ | CH$_3$ | H | H | 427 nm |
| 29 | n-C$_3$H$_7$ | C$_2$H$_5$ | H | H | 427 nm |
| 30 | CH$_3$ | H | H | H | 427 nm |
| 31 | CH$_3$ | CH$_3$ | H | H | 427 nm |
| 32 | CH$_3$ | C$_2$H$_5$ | H | H | 427 nm 228–231 |
| 33 | CH$_3$ | n-C$_4$H$_9$ | H | H | 427 nm |
| 34 | C$_6$H$_5$OCH$_2$ | CH(CH$_3$)$_2$ | H | H | 428 nm |
| 35 | C$_6$H$_5$OCH$_2$ | CH$_3$ | H | H | 428 nm |
| 36 | C$_6$H$_5$OCH$_2$ | C$_2$H$_5$ | H | H | 428 nm |
| 37 | C$_6$H$_5$OCH$_2$ | n-C$_3$H$_7$ | H | H | 428 nm |
| 38 | CH$_3$OCH$_3$ | n-C$_3$H$_7$ | H | H | 428 nm |
| 39 | CH$_3$OCH$_3$ | C$_2$H$_5$ | H | H | 428 nm |
| 40 | CH$_3$OCH$_3$ | i-C$_3$H$_7$ | H | H | 428 nm |
| 41 | CH$_3$O$_2$C—C$_2$H$_4$ | C$_2$H$_5$ | H | H | 429 nm |
| 42 | CH$_3$O$_2$C—C$_2$H$_4$ | CH$_3$ | H | H | 429 nm |
| 43 | C$_2$H$_5$O$_2$C—C$_2$H$_4$ | C$_2$H$_5$ | H | H | 429 nm |
| 44 | H$_9$C$_4$O$_2$C—C$_2$H$_4$ | C$_2$H$_5$ | H | H | 429 nm |
| 45 | H$_{13}$C$_6$O$_2$C—C$_2$H$_4$ | C$_2$H$_5$ | H | H | 429 nm |
| 46 | C$_4$H$_9$O$_2$H$_4$O$_2$CC$_2$H$_4$ H$_3$—O$_2$ | C$_2$H$_5$ | H | H | 429 nm |
| 47 | CACH$_2$O$_2$CC$_2$H$_4$ H$_9$C$_4$ | C$_2$H$_5$ | H | H | 429 nm |
| 48 | 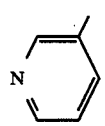 | C$_2$H$_5$ | H | H | 430 nm |

EXAMPLE 5

23.5 parts of the diazo component of the formula

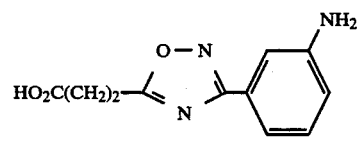

are diazotized in a conventional manner, and the resulting diazonium salt solution is run into a very thoroughly stirred solution of 24 parts of the coupling component of the formula

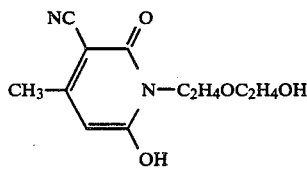

in 500 parts of water, 200 parts of ice and 10 parts of sodium carbonate.

The coupling mixture is brought to pH 3.5–4.5, and the precipitated dye of the formula

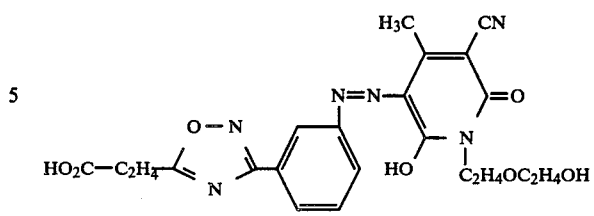

is filtered off under suction and isolated in a conventional manner. Drying of the product gives 46 parts of a yellow powder, which dyes nylon fabrics and leather in greenish yellow hues with good fastness properties.

The yellow dyes of the general formula VIII which are shown in Table G can be obtained by a procedure similar to that described in Example 5.

TABLE G

| No. | R | $R^1$ | $R^2$ | X | Y | $\lambda_{max.}$ (nm) |
|---|---|---|---|---|---|---|
| 1 | n-$C_7H_{15}$ | H | H | $NO_2$ | H | 435 nm |
| 2 | n-$C_7H_{15}$ | H | $COCH_3$ | $NO_2$ | H | 439 nm |
| 3 | n-$C_7H_{15}$ | $CH_3$ | $COCH_3$ | $NO_2$ | H | 438 nm |
| 4 | n-$C_7H_{15}$ | $CH_3$ | H | $NO_2$ | H | 435 nm |
| 5 | n-$C_4H_9$—CH($C_2H_5$)— | H | H | $NO_2$ | H | 435 nm |
| 6 | n-$C_4H_9$—CH($C_2H_5$)— | H | $COCH_3$ | $NO_2$ | H | 439 nm |
| 7 | n-$C_4H_9$—CH($C_2H_5$)— | $CH_3$ | $COCH_3$ | $NO_2$ | H | 438 nm |
| 8 | n-$C_4H_9$—CH($C_2H_5$)— | $CH_3$ | H | $NO_2$ | H | 436 nm |
| 9 | n-$C_4H_9$—CH($C_2H_5$)— | H | CN | $NO_2$ | H | 446 nm |
| 10 | n-$C_4H_9$—CH($C_2H_5$)— | $CH_3$ | CN | $NO_2$ | H | 447 nm |
| 11 | n-$C_4H_9$—CH($C_2H_5$)— | $CH_3$ | CN | Br | H | 438 nm |
| 12 | n-$C_4H_9$—CH($C_2H_5$)— | H | CN | Br | H | 439 nm |
| 13 | n-$C_4H_9$—CH($C_2H_5$)— | H | CN | Cl | H | 439 nm |
| 14 | n-$C_4H_9$CH($C_2H_5$)— | $C_2H_5$ | H | $NO_2$ | H | 437 nm |
| 15 | n-$C_4H_9$CH($C_2H_5$)— | n-$C_4H_9$ | H | $NO_2$ | H | 437 nm |

TABLE G-continued

Structure VIII: R-C(=N-O)(N)-[benzene with X, Y]-N=N-[pyridone with H3C, R², =O, HO, N-R¹]

| No. | R | R¹ | R² | X | Y | λmax. (nm) |
|---|---|---|---|---|---|---|
| 16 | C₆H₅OCH₂ | C₂H₅ | CN | H | H | 440 nm |
| 17 | C₆H₅OCH₂ | CH₃ | CN | H | H | 440 nm |
| 18 | n-C₁₁H₂₃ | C₄H₉ | CN | H | H | 440 nm |
| 19 | n-C₁₁H₂₃ | n-C₆H₁₃ | CN | H | H | 440 nm |
| 20 | n-C₁₁H₂₃ | C₃H₆OCH₃ | CN | H | H | 440 nm |
| 21 | n-C₄H₉—CH(C₂H₅)— | C₃H₆OCH₃ | CN | H | H | 440 nm |
| 22 | n-C₄H₉—CH(C₂H₅)— | n-C₆H₁₃ | n-C₆H₁₃ | H | H | 440 nm |
| 23 | n-C₄H₉—CH(C₂H₅)— | C₃H₆OC₄H₈OH | CN | H | H | 440 nm |
| 24 | n-C₁₁H₂₃ | C₃H₆OC₄H₈OH | CN | H | H | 440 nm |
| 25 | n-C₁₅H₃₁ | C₃H₆OC₄H₈OH | CN | H | H | 440 nm |
| 26 | n-C₁₅H₃₁ | C₃H₆OCH₃ | CN | H | H | 440 nm |
| 27 | n-C₁₅H₃₁ | n-C₄H₉ | CN | H | H | 440 nm |
| 28 | HO₂CC₂H₄— | H | CN | H | H | 440 nm |
| 29 | HO₂CC₂H₄— | H | CONH₂ | H | H | 426 nm |
| 30 | HO₂CC₂H₄— | CH₃ | CONH₂ | H | H | 426 nm |
| 31 | HO₂CC₂H₄— | CH₃ | CN | H | H | 440 nm |
| 32 | HO₂CC₂H₄— | CH₃ | CONH₂ | Br | H | 428 nm |
| 33 | HO₂CC₂H₄— | C₂H₅ | CONH₂ | Br | H | 428 nm |
| 34 | HO₂CC₂H₄— | C₂H₅ | CONH₂ | H | H | 426 nm |
| 35 | HO₂CC₂H₄— | C₂H₄OCH₃ | CONH₂ | H | H | 426 nm |
| 36 | HO₂CC₂H₄— | C₂H₄OCH₃ | CN | H | H | 440 nm |
| 37 | HO₂CC₂H₄— | C₃H₆OCH₃ | CN | H | H | 440 nm |
| 38 | HO₂CC₂H₄— | C₃H₆OCH₃ | CONH₂ | H | H | 426 nm |
| 39 | HO₂CC₂H₄— | C₃H₆OCH₃ | CONH₂ | Br | H | 428 nm |
| 40 | HO₂CCH=CH— | H | CN | H | H | 440 nm |
| 41 | HO₂CCH=CH— | CH₃ | CN | H | H | 440 nm |
| 42 | HO₂CC₂H₄ | C₂H₄OH | CN | Br | H | 441 nm |
| 43 | HO₂CC₂H₄ | C₃H₆OH | CN | Br | H | 440 nm |
| 44 | HO₂CC₂H₄ | C₂H₄OC₂H₄OH | CN | H | H | 440 nm |
| 45 | HO₂CCH=CH— | C₃H₆OH | CN | H | H | 440 nm |
| 46 | HO₂CCH=CH— | C₂H₄OH | CN | H | H | 440 nm |
| 47 | HO₂CCH=CH— | C₂H₄OCH₃ | CN | H | H | 440 nm |
| 48 | HO₂CCH=CH— | C₃H₆OCH₃ | CN | H | H | 440 nm |
| 49 | HO₂CCH=CH— | C₂H₄OC₂H₄OH | CN | H | H | 440 nm |
| 50 | HO₂CCH₂ | C₂H₄OC₂H₄OH | CN | H | H | 440 nm |
| 51 | HO₂CCH₂ | C₂H₄OH | CN | H | H | 440 nm |
| 52 | HO₂CCH₂ | C₃H₆OH | CN | H | H | 440 nm |
| 53 | HO₂CCH=CH— | C₂H₄OCH₃ | CONH₂ | H | H | 426 nm |
| 54 | HO₂CCH=CH— | C₃H₆OCH₃ | CONH₂ | H | H | 427 nm |
| 55 | HO₂C(CH₂)₃— | C₃H₆OCH₃ | CN | H | H | 440 nm |
| 56 | HO₂C(CH₂)₃— | C₂H₄OH | CN | H | H | 440 nm |
| 57 | HO₂C(CH₂)₄— | C₂H₄OH | CN | H | H | 440 nm |
| 58 | HO₂C(CH₂)₄— | C₂H₄OC₂H₄OH | CN | H | H | 440 nm |
| 59 | n-C₃H₇ | CH₃ | CN | Br | Br | 416 nm |
| 60 | n-C₄H₉—CH(C₂H₅)— | H | COCH₃ | H | H | 428.5 nm |
| 61 | n-C₄H₉—CH(C₂H₅)— | H | COCH₃ | Br | H | 428.5 nm |
| 62 | CH₃O₂CC₂H₄ | C₂H₅ | CN | H | H | 439 nm |

The dyes stated in Table H can be prepared by a procedure similar to that described in Examples 9, 10 and 11.

TABLE H

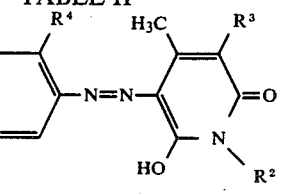

| No. | R¹ | R² | R³ | R⁴ | Hue | max. (nm) |
|---|---|---|---|---|---|---|
| 1 | C₆H₅ | n-C₁₃H₂₇ | CN | H | yellow | 440 |
| 2 | C₆H₅ | n-C₁₃H₂₇ | CN | Cl | yellow | 442 |
| 3 | C₆H₅ | i-C₈H₁₇ | CN | Cl | yellow | 442 |
| 4 | C₆H₅ | i-C₈H₁₇ | CN | OCH₃ | yellow | 449 |
| 5 | Cl-C₆H₄- | i-C₈H₁₇ | CN | H | yellow | 441 |
| 6 | C₃H₇ | i-C₈H₁₇ | CN | H | yellow | 440 |
| 7 | C₃H₇ | i-C₈H₁₇ | CN | Cl | yellow | 442 |
| 8 | CH₃ | n-C₁₃H₂₇ | CONH₂ | H | yellow | 425.5 |
| 9 | CH₃ | n-C₁₃H₂₇ | CONH₂ | Cl | yellow | 427 |
| 10 | CH₃ | n-C₁₂H₂₅ | COCH₃ | Cl | yellow | 427.5 |
| 11 | CH₃ | n-C₁₂H₂₅ | COCH₃ | H | yellow | 427.5 |
| 12 | C₄H₉CH(C₂H₅)— | n-C₄H₉ | CONH₂ | H | yellow | 426 |
| 13 | C₅H₁₁ | i-C₈H₁₇ | CONH₂ | H | yellow | 426 |

EXAMPLE 6

21 parts of the compound of the formula

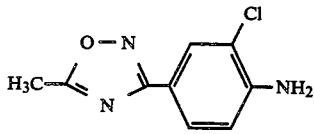

are stirred thoroughly overnight with 50 parts of a 30% strength hydrochloric acid and 1 part of a dispersant which is effective under acidic conditions. The mixture is then cooled to 0°–5° C., and 32–34 parts of a 23% strength sodium nitrite solution are run in under the surface of the suspension in the course of about 20–30 minutes, the temperature being kept at 0°–5° C. during this procedure by the addition of ice. The diazotization mixture is stirred for a further 2–3 hours at from 0° to 5° C., after which about 150 parts of ice water are added, nitrite is destroyed in a conventional manner and the pH of the diazotization mixture is brought to 0.5–1.0 with a little sodium formate. A solution comprising 23.6 parts of 1-n-hexyl-2-hydroxy-3-cyano-4-methylpyrid-6-one, 300 parts by volume of water and 12 parts of 50% strength sodium hydroxide solution is then run in. Coupling is complete after a few minutes. The precipitated dye is filtered off under suction, washed with water and dried, these steps being carried out in a conventional manner. 45 parts of a yellow powder of the formula

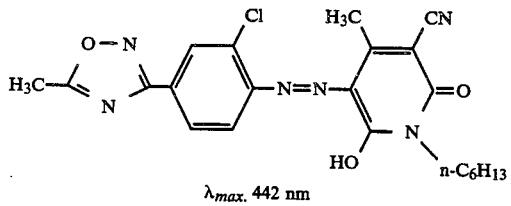

λmax. 442 nm are obtained. The product dissolves in dimethylformamide to give a yellow solution, and dyes polyester fabric in very lightfast deep yellow hues.

EXAMPLE 7

24.5 parts of the diazo component of the formula

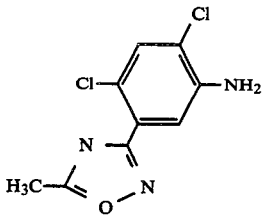

are diazotized with 33 parts of a 44% strength nitrosylsulfuric acid by a procedure similar to that described in Example 1, the mixture is poured onto ice and water and then stirred until the reaction is complete, and a solution of 23.6 parts of 1-n-hexyl-2-hydroxy-3-cyano-4-methylpyrid-6-one in 250 parts of water and 18 parts of 50% strength sodium hydroxide solution, as well as 1 part of a dispersant (based on an ethylene oxide polymer), are added.

When coupling is complete, the mixture is worked up in a conventional manner to give 48.0 parts of the dye of the formula

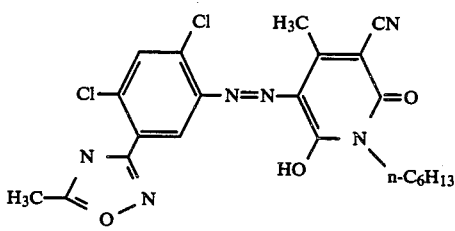

in the form of a yellow powder. This product dissolves in dimethylformamide to give a yellow solution and gives, on polyester fabric, dyeings having good fastness properties.

EXAMPLE 8

26.5 parts of the diazo component of the formula

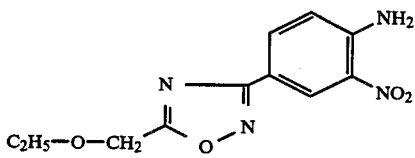

are diazotized with 34 parts of nitrosylsulfuric acid by a procedure similar to that described in Example 1.

The diazonium salt solution is poured onto ice and stirred to complete the reaction, and 1 part of a dispersant which is effective under acidic conditions is added. Excess nitrous acid is destroyed, after which a solution of 26.4 parts of the coupling component 1-(2-ethylhexyl)-2-hydroxy-3-cyano-4-methylpyrid-6-one in 150 parts by volume of dimethylformamide, 0.5 part of a dispersant, 15 parts of 50% strength sodium hydroxide solution and 30 parts of water are run in, while stirring very thoroughly. Stirring is continued for 1-2 hours, after which the pH of the coupling solution is increased to 6-7.5 by the addition of sodium hydroxide solution.

The product is filtered off under suction, washed with water and dried, these steps being carried out in a conventional manner, and 53 parts of the dye of the formula

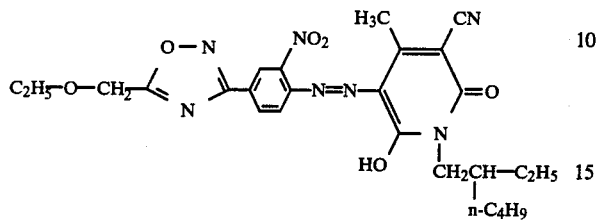

are obtained in the form of a yellow powder. This product dissolves in dimethylformamide to give a yellow solution, and dyes polyester fabric in very lightfast deep hues.

EXAMPLE 9

Using the roller printing method, a cotton fabric is printed with a printing paste which consists of 15 parts of the dye of the formula

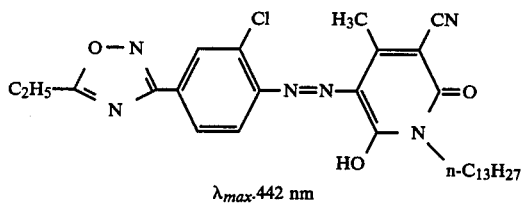

$\lambda_{max}$ 442 nm 110 parts of polyethylene oxide having a molecular weight of 350, 30 parts of oleic acid diethanolamide and 845 parts of a 10% strength alginate thickener. The print is dried at 100° C., and is then fixed by treating it with hot air at 195° C. for 1 minute. Finishing is carried out and a fast, yellow print on a white ground is obtained.

EXAMPLE 10

On a screen printing machine, a polyester/cellulose blend (weight ratio 67:35) is printed with a mixture which consists of 30 parts of the dye of the formula

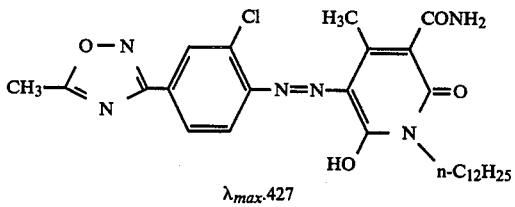

$\lambda_{max}$ 427

100 parts of the reaction product of 3 moles of polyethylene oxide of molecular weight 300 with 1 mole of boric acid, 30 parts of oleic acid diethanolamide and 840 parts of a 3% strength alginate thickener. The print is dried at 110° C., and is then treated with steam at 185° C. for 5 minutes. It is finished and a fast, yellow print on a white ground is obtained.

EXAMPLE 11

Using a padding machine, a cotton fabric is padded with a solution which contains 20 parts of the dye of the

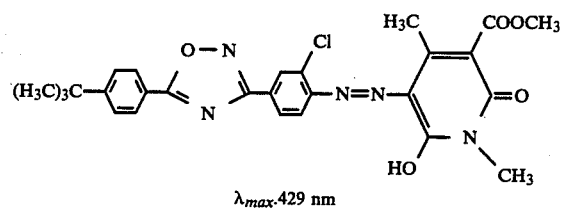

$\lambda_{max}$ 429 nm 300 parts of a 3% strength alginate thickener, 550 parts of water and 130 parts of polyethylene oxide having a molecular weight of 300. The wet pick-up of the fabric should be 80%. The fabric is dried at 100° C., and the dye is fixed by treatment with steam at 190° C. for 5 minutes. The fabric is then rinsed with cold water, and washed at 90° C. in a bath containing 3 parts of the condensation product of a long-chain alcohol with ethylene oxide in 997 parts of water.

A yellow dyeing is obtained.

Instead of a cotton fabric, it is also possible to pad a polyester/cotton blend (weight ratio 67:33) with the solution described. In the resulting yellow dyeing, the two phases are of the same hue. The treatment with steam can also be replaced by fixing with hot air at 195° C. for 2 minutes.

We claim:

1. A compound of the formula

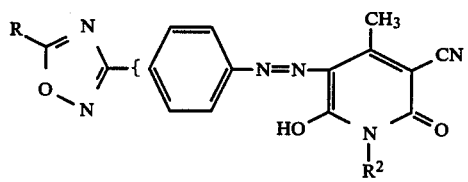

wherein

R is $C_3$–$C_{17}$-alkyl, or phenoxymethyl, and $R^2$ is hydrogen, $C_1$–$C_6$-alkyl or allyl, wherein $R^2$ is not hydrogen if R is phenoxymethyl.

2. The compound of claim 1, wherein the oxadiazolyl radical is in the m-position.

* * * * *